(12) United States Patent
Shigeta et al.

(10) Patent No.: US 9,857,482 B2
(45) Date of Patent: Jan. 2, 2018

(54) SCINTILLATOR PANEL, RADIATION DETECTOR, AND MANUFACTURING METHOD THEREFOR

(71) Applicant: TORAY INDUSTRIES, INC., Tokyo (JP)

(72) Inventors: Kazuki Shigeta, Otsu (JP); Tsubasa Hamano, Otsu (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 15/323,849

(22) PCT Filed: Jun. 29, 2015

(86) PCT No.: PCT/JP2015/068598
§ 371 (c)(1),
(2) Date: Jan. 4, 2017

(87) PCT Pub. No.: WO2016/006483
PCT Pub. Date: Jan. 14, 2016

(65) Prior Publication Data
US 2017/0146671 A1    May 25, 2017

(30) Foreign Application Priority Data
Jul. 7, 2014   (JP) ................... 2014-139399

(51) Int. Cl.
*G01T 1/20* (2006.01)
*G21K 4/00* (2006.01)

(52) U.S. Cl.
CPC ............. *G01T 1/2018* (2013.01); *G21K 4/00* (2013.01); *G21K 2004/02* (2013.01); *G21K 2004/06* (2013.01)

(58) Field of Classification Search
CPC ...... G01T 1/202; G01T 1/2002; G01T 1/2018
See application file for complete search history.

(56) References Cited

U.S. PATENT DOCUMENTS 3,706,885 A * 12/1972 Fister .................... H01J 29/385
                                                      250/214 VT
4,571,312 A *  2/1986 Greskovich ............ C04B 35/50
                                                      264/1.22

(Continued)

FOREIGN PATENT DOCUMENTS

| JP | 02111902 A * | 4/1990 |
| JP | 2001141897 | 5/2001 |

(Continued)

OTHER PUBLICATIONS

International Search Report and Written Opinion for International Application No. PCT/JP2015/068598, dated Aug. 4, 2015, 7 pages.

*Primary Examiner* — Kiho Kim
(74) *Attorney, Agent, or Firm* — RatnerPrestia

(57) ABSTRACT

The present invention provides a scintillator panel which is capable of utilizing light emitted by a phosphor at a high efficiency due to particles having a high refractive index being dispersed within a scintillator layer in a favorable state, which thus allows for a marked reduction in the amount of radiation exposure to a subject or the like, and which has a high luminance. The present invention also provides a scintillator panel including a substrate, and a scintillator layer containing metal compound particles and a phosphor, wherein the phosphor is covered by the metal compound at a coverage ratio of 5% or more.

21 Claims, 1 Drawing Sheet

(56) References Cited

U.S. PATENT DOCUMENTS

| | | | | |
|---|---|---|---|---|
| 4,977,327 | A * | 12/1990 | Arakawa | G21K 4/00 250/484.4 |
| 6,921,909 | B2 * | 7/2005 | Nagarkar | G21K 4/00 250/363.01 |
| 8,133,461 | B2 * | 3/2012 | Tao | C09K 11/777 423/263 |
| 8,338,790 | B2 * | 12/2012 | Levene | G01T 1/202 250/367 |
| 2002/0079455 | A1 * | 6/2002 | Wieczorek | G01T 1/2018 250/367 |
| 2006/0033030 | A1 * | 2/2006 | Ito | G01T 1/2018 250/370.11 |
| 2006/0226370 | A1 | 10/2006 | Gia | |
| 2010/0264322 | A1 | 10/2010 | Levene | |
| 2010/0296625 | A1 * | 11/2010 | Wainer | G01T 1/2018 378/19 |
| 2011/0133095 | A1 | 6/2011 | Imai | |
| 2011/0204398 | A1 * | 8/2011 | Tanida | H01L 33/486 257/98 |
| 2012/0219114 | A1 * | 8/2012 | Iwakiri | G03B 42/04 378/62 |
| 2013/0146776 | A1 * | 6/2013 | Mollov | G01T 1/20 250/369 |

FOREIGN PATENT DOCUMENTS

| | | |
|---|---|---|
| JP | 2006143914 | 6/2006 |
| JP | 2006153874 | 6/2006 |
| JP | 2011508202 | 3/2011 |
| JP | 2011124334 | 6/2011 |
| JP | 2011141134 | 7/2011 |
| JP | 2014106022 | 6/2014 |
| RU | 2010134023 A * | 2/2012 |
| WO | 2014092202 | 6/2014 |

* cited by examiner

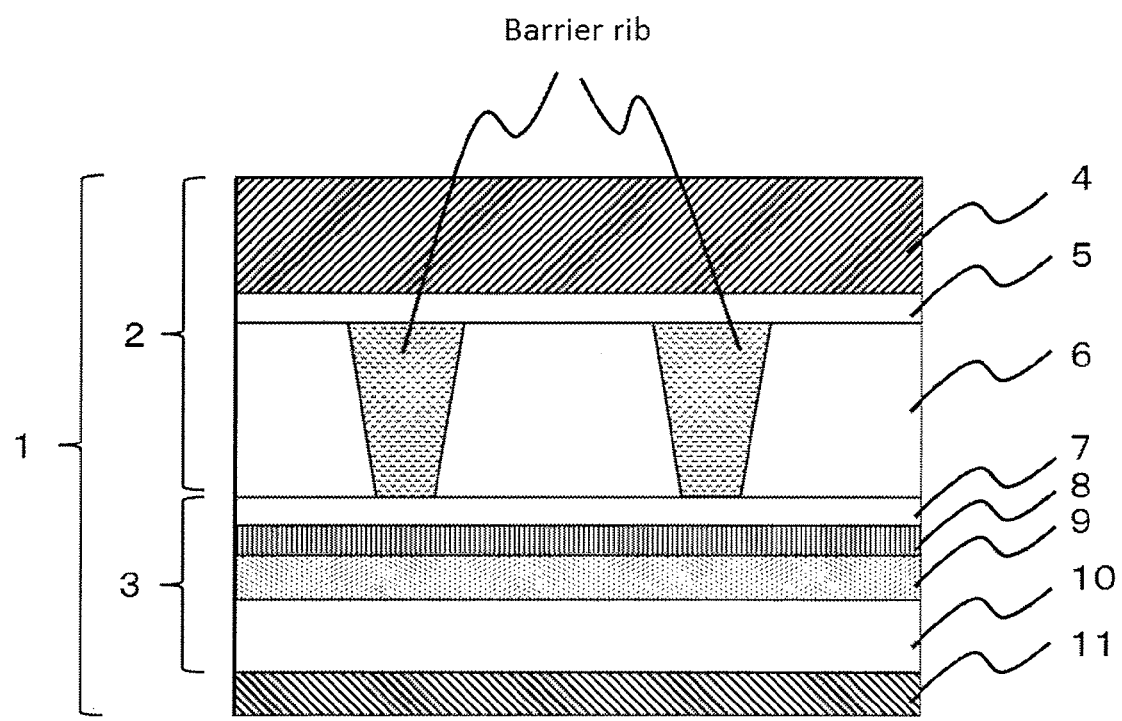

SCINTILLATOR PANEL, RADIATION DETECTOR, AND MANUFACTURING METHOD THEREFOR

CROSS REFERENCE TO RELATED APPLICATIONS

This is the U.S. National Phase application of PCT International Application No. PCT/JP2015/068598, filed Jun. 29, 2015, and claims priority to Japanese Patent Application No. 2014-139399, filed Jul. 7, 2014, the disclosures of each of these applications being incorporated herein by reference in their entireties for all purposes.

FIELD OF THE INVENTION

The present invention relates to a scintillator panel, a radiation detector, and a method of manufacturing the same.

BACKGROUND OF THE INVENTION

Conventionally, radiographs using films have been widely used in clinical settings. However, information provided by the radiographs using films are analog image information, and thus, digital radiation detectors such as a computed radiography (CR) detector, a flat panel detector (hereinafter referred to as "FPD") and the like have been developed in recent years.

In a FPD, a scintillator panel is used to convert radiation into visible light. The scintillator panel includes a scintillator layer containing a radiation phosphor such as gadolinium oxysulfide (hereinafter referred to as "GOS") or cesium iodide (hereinafter referred to as "CsI"), and the phosphor emits visible light in response to the applied radiation. The emitted light is then converted into an electrical signal by a TFT or a CCD, and as a result, the radiation information is converted to digital image information. At this time, if the energy of the radiation to be applied is increased in order to improve the luminance of the scintillator panel, the emission intensity of the phosphor is also increased. However, in order to reduce the amount of radiation exposure to a subject or the like, on the other hand, it is required to utilize the light emitted by the phosphor at a high efficiency, without excessively increasing the energy of the radiation to be applied.

One of the causes of the reduction in the utilization efficiency of the light emitted by the phosphor is that the emitted light is scattered due to the phosphor itself, as a result of which the emitted light is absorbed within the scintillator layer. In order to reduce the scattering of light, a technique has been proposed in which particles having a high refractive index comparable to the refractive index of the phosphor are incorporated into the scintillator layer (Patent Document 1).

PATENT DOCUMENT

Patent Document 1: JP 2006-153874 A

SUMMARY OF THE INVENTION

However, in the conventional technique in which particles having a high refractive index are incorporated in the scintillator layer, it has been difficult to disperse the above described particles within the scintillator layer in a favorable state, and the fact that the particles aggregate to cause cloudiness, which in turn further accelerates the scattering of the emitted light of the phosphor, has been considered problematic.

Therefore, an object of the present invention is to provide a scintillator panel which is capable of utilizing light emitted by a phosphor at a high efficiency due to particles having a high refractive index being dispersed within a scintillator layer in a favorable state, which thus allows for a marked reduction in the amount of radiation exposure to a subject or the like, and which has a high luminance.

The above described object is achieved by a scintillator panel including: a substrate; and a scintillator layer containing a metal compound and a phosphor; wherein the phosphor is covered by the metal compound at a coverage ratio of 5% or more.

According to the present invention, it is possible to provide a scintillator panel which has a high luminance, and which allows for a marked reduction in the amount of radiation exposure to a subject or the like, since particles having a high refractive index are well dispersed within the scintillator layer, and thus the light emitted by the phosphor can be utilized at a high efficiency.

BRIEF DESCRIPTION OF THE DRAWINGS

The FIGURE is a sectional view schematically showing the configuration of a radiation detector including the scintillator panel according to an embodiment of the present invention.

DETAILED DESCRIPTION OF EMBODIMENTS OF THE INVENTION

The scintillator panel according to an aspect of present invention is characterized by including: a substrate; and a scintillator layer containing a metal compound and a phosphor; wherein the phosphor is covered by the metal compound at a coverage ratio of 5% or more.

Preferred embodiments of the scintillator panel according to the present invention and a radiation detector including the same will now be described below, with reference to drawings. However, the present invention is in no way limited by the following embodiments.

The FIGURE is a sectional view schematically showing the configuration of a radiation detector including the scintillator panel according to an embodiment of the present invention. A radiation detector 1 includes a scintillator panel 2, a photodiode substrate 3, and a power supply portion 11. The scintillator panel 2 includes a scintillator layer 6 containing a metal compound and a phosphor. The scintillator panel 2 absorbs the energy of the applied radiation, and emits an electromagnetic wave having a wavelength of from 300 to 800 nm, namely, light ranging from ultraviolet to infrared, which are mainly visible rays.

The photodiode substrate 3 includes: a substrate 10; and on the substrate 10, a photoelectric conversion layer 8 in which pixels each including a photodiode and TFT are formed two dimensionally, and an output layer 8. The light exit surface of the scintillator panel 2 and the photoelectric conversion layer 9 of the photodiode substrate 3 are adhered or brought into close contact with each other via a diaphragm layer 7 made of a polyimide resin, a siloxane resin or the like, to form a radiation detector 1. A luminous body of the phosphor which has reached the photoelectric conversion layer 8 is then photoelectrically converted at the photoelectric conversion layer 8, to be output.

Examples of the material of the substrate included in the scintillator panel according to the present invention include radiolucent materials such as glasses, ceramics, semiconductors, high molecular weight compounds, metals and amorphous carbons. Examples of the glass include quartz glass, borosilicate glass, and chemically tempered glass. Examples of the ceramic include sapphire, silicon nitride, and silicon carbide. Examples of the semiconductor include silicon, germanium, gallium arsenide, gallium phosphide, and gallium nitrogen. Examples of the high molecular weight compound include cellulose acetate, polyester, polyethylene terephthalate, polyamide, polyimide, triacetate, polycarbonate, and carbon fiber reinforced resins. Examples of the metal include aluminum, iron, copper, and metal oxides. Of these, a material having an excellent flatness and heat resistance is preferred. Since lighter-weight scintillator panels are increasingly required for convenience of transportation of the scintillator panel, the substrate preferably has a thickness of 2.0 mm or less, and more preferably, 1.0 mm or less.

The scintillator layer included in the scintillator panel according to an aspect of the present invention contains a metal compound and a phosphor, and the metal compound is in contact or in proximity with the surface of the phosphor, namely, the phosphor is covered by the metal compound. The coverage ratio of the phosphor by the metal compound is 5% or more. However, the coverage ratio is preferably 20% or more, and more preferably 50% or more. When the coverage ratio is 5% or more, the difference in refractive index between the phosphor and the air is decreased, and the emitted light of the phosphor can be efficiently guided to the photodiode included in the photodiode substrate, thereby improving the luminance. Examples of the metal compound include titania, zirconia, alumina, ceria, tin oxide, indium oxide, zircon, iron oxide, zinc oxide, niobium oxide, silicon nitride, boron nitride, aluminum nitride, silicon carbide, aluminum hydroxide, barium titanate, and diamond. In terms of high refractive index and availability, an aluminum compound, a tin compound, a titanium compound, a zirconium compound, or a niobium compound is preferred. More specific examples thereof include oxides, sulfides, hydroxides and the like of aluminum, tin, titanium and zirconium. However, zirconium oxide particles or titanium oxide particles are preferred, in terms of adjusting the refractive index of the resulting coating film and cured film.

The coverage ratio of the phosphor by the metal compound can be obtained by: randomly selecting 20 particles of the phosphor from a two dimensional image obtained by observing the cross section of the scintillator layer with a scanning electron microscope (hereinafter, referred to as "SEM"; for example, S-2400 manufactured by Hitachi Ltd.); dividing the circumference of each of the particles into hundredths; obtaining the ratio (%) of the area in which the metal compound is present, to the area within 500 nm from the surface of each of the phosphor particles; and then by calculating the mean value of the obtained ratios. Examples of polishing methods to allow an observation of the cross section of the scintillator layer include a mechanical polishing method, a microtome method, a CP (Cross-section Polisher) method, and a focused ion beam (FIB) processing method.

The metal compound is preferably in the form of fine powder, in other words, the metal compound is preferably metal compound particles. When the metal compound is metal compound particles, the covering of the surface of the phosphor can be easily achieved by mixing the particles with the phosphor.

The porosity of the scintillator layer including the metal compound and the phosphor is preferably from 1 to 50%, and more preferably from 5 to 30%. When the porosity is within the above range, it is possible to improve MTF (Modulation Transfer Function, which is one of the indices for evaluating lens performance, and is spatial frequency characteristics) which is an index of the sharpness of an image, while maintaining a high luminance.

The porosity of the scintillator layer can be obtained by: observing the cross section of the scintillator layer which has been subjected to a precision polishing, with a SEM; converting solid portions (the phosphor, the metal compound and a binder resin and the like) and cavity portions of an obtained image into two-gray scale; and calculating the ratio of the area of the cavity portions to the total area of the cross section of the scintillator layer, as the porosity. Further, the MTF can be measured by: placing a lead plate which is not radiolucent on a radiation detector including the scintillator panel; applying radiation at a tube voltage of 80 kVp from the substrate side of the scintillator panel to obtain an image; and determining the MTF by an edge method based on the image.

The metal compound particles to be included in the scintillator layer are preferably grafted.

The phrase "the metal compound particles are grafted" refers to a state in which a high molecular weight compound is chemically bound (grafted) to the surface of the metal compound particles through hydroxyl groups and the like present on the particle surface. When the metal compound particles are grafted, an occurrence of cracks in the scintillator layer can be reduced. Further, when the scintillator layer contains a binder resin, the metal compound particles are well dispersed in the binder resin. As a result, the transparency of the scintillator layer is improved, and the difference in refractive index between the binder resin and the phosphor can be reduced.

Examples of the high molecular weight compound for grafting the metal compound particles include water-soluble high molecular weight compounds such as poly(N-isopropylacrylamides), polyethylene glycols, polyacrylamides, polyvinyl alcohols, polyethylene oxides, polyvinyl pyrrolidones, resole resins, urea resins and melamine resins; and water-insoluble high molecular weight compounds such as polysiloxanes, 1,4-cis-isoprene, isoprene elastomers, polystyrenes, polybutadienes, polyisoprenes, polymethyl methacrylates, poly n-butyl acrylates, polyvinyl chlorides, polyacrylonitriles and polylactic acids.

It is possible to find out whether the surfaces of the metal compound particles are grafted or not, by observing the contours of the metal compound particles with a SEM or a transmission electron microscope (hereinafter referred to as "TEM"). When the particles are grafted, the contours of the metal compound particles are unclear; whereas when the particles are not grafted, the contours of the metal compound particles are clear, and particles having a size corresponding to the particle diameter of the metal compound particles can be clearly observed.

The refractive index of the grafted metal compound particles is preferably 1.7 or more, and more preferably 2.0 or more. When the refractive index is 1.7 or more, the difference in refractive index between the metal compound particles and the phosphor can be reduced to inhibit the scattering of visible light.

The refractive index of the grafted metal compound particles can be measured using a refractometer (for example, Prism Coupler MODEL 2010/M; manufactured by Metricon Corporation). More specifically, a coating film of the grafted metal compound particles to be measured is formed, and light having a wavelength of 633 nm is irradiated (using He—Ne laser) vertically to the surface of the coating film at 25° C.; and then the refractive index (TE) of the light is measured, to be used as the refractive index of the grafted metal compound particles.

The refractive index of the phosphor can be measured by the Becke line method, a liquid immersion method or an extrapolation method. Data values described in "Phosphor Handbook" and the like can also be used.

Examples of the grafted metal compound particles which are particularly preferred among the commercially available metal compound particles, include tin oxide-titanium oxide composite particles such as OPTOLAKE (registered trademark) TR-502, TR-504 and TR-520; silicon oxide-titanium oxide composite particles such as OPTOLAKE (registered trademark) TR-503, TR-527, TR-528, TR-529 and TR-513; and titanium oxide particles such as OPTOLAKE (registered trademark) TR-505 (all of the above manufactured by Catalyst & Chemicals Industries Co., Ltd). Examples also include zirconium oxide particles (manufactured by Kojundo Chemical Lab. Co., Ltd.); tin oxide-zirconium oxide composite particles (manufactured by Catalyst & Chemicals Industries Co., Ltd); and tin oxide particles (manufactured by Kojundo Chemical Lab. Co., Ltd.).

The average particle diameter of the grafted metal compound particles is preferably from 1 to 50 nm, and more preferably from 1 to 30 nm. When the average particle diameter is less than 1 nm, it may be difficult to for the particles to exist as particles. When the average particle diameter is more than 50 nm, on the other hand, the scattering of light is more likely to occur, and there are cases where the light transmittance of the scintillator layer is reduced.

The average particle diameter of the grafted metal compound particles refers to a mean value obtained by: randomly selecting 200 metal compound particles from a two dimensional image obtained by observing the cross section of the scintillator layer with a SEM; measuring the particle diameter of each of the metal compound particles; and calculating the average of the measured values of the particle diameter. The particle diameter of each of the metal compound particles as used herein refers to the length of the longest line, of the straight lines intersecting the edge of a particle at two points.

The grafted metal compound particles are preferably obtained by mixing the metal compound particles, an alkoxysilane compound, a solvent and an acid catalyst. In this case, it is thought that the alkoxysilane compound is hydrolyzed by the acid catalyst to produce a silanol compound, and the metal compound particles are then grafted by a polysiloxane which is produced by condensation polymerization of the silanol compound, and which has an excellent heat resistance and weather resistance.

The alkoxysilane compound to be used is preferably composed of a trifunctional alkoxysilane compound alone, or a combination of a trifunctional alkoxysilane compound and a bifunctional alkoxysilane compound. In terms of suitably adjusting the hardness and improving the handleability of the scintillator layer, the alkoxysilane compound is more preferably an alkoxysilane compound containing from 100 to 70% by mole of a trifunctional alkoxysilane compound and from 0 to 30% by mole of a bifunctional alkoxysilane compound, and still more preferably an alkoxysilane compound containing from 90 to 80% by mole of a trifunctional alkoxysilane compound and from 10 to 20% by mole of a bifunctional alkoxysilane compound.

The alkoxysilane compound to be used preferably contains an alkoxysilane compound represented by any of the following general formulas (1) to (3):

[Chem. 1]

$$\text{Si}(\text{OR}^4)_3 \quad (1)$$

(wherein $R^1$ represents a hydrogen atom, an alkyl group, an alkenyl group, an aryl group or a naphthyl group, or a substitution product thereof; $R^4$s each independently represents a methyl group, an ethyl group, a propyl group, an isopropyl group or a butyl group),

[Chem. 2]

$$R^2R^3\text{Si}(\text{OR}^5)_2 \quad (2)$$

(wherein, $R^2$ and $R^3$ each independently represents a hydrogen atom, an alkyl group, an alkenyl group, an aryl group or a naphthyl group, or a substitution product thereof; and $R^5$s each independently represents a methyl group, an ethyl group, a propyl group, an isopropyl group or a butyl group) and

[Chem. 3]

$$\text{Si}(\text{OR}^6)_4 \quad (3)$$

(wherein $R^6$s each independently represents a methyl group or an ethyl group).

In terms of crack resistance, each of $R^1$, $R^4$ and $R^5$ is preferably a methyl group or a phenyl group.

Examples of trifunctional alkoxysilane compounds represented by the general formula (1) include methyltrimethoxysilane, methyltriethoxysilane, methyltripropoxysilane, methyltriisopropoxysilane, methyltributoxysilane, ethyltrimethoxysilane, ethyltriethoxysilane, hexyltrimethoxysilane, octadecyltrimethoxysilane, octadecyltriethoxysilane, phenyltrimethoxysilane, phenyltriethoxysilane, phenyltriisopropoxysilane, 3-aminopropyltriethoxysilane, N-(2-aminoethyl)-3-aminopropyltrimethoxysilane, 3-chloropropyltrimethoxysilane, 3-(N,N-diglycidyl)aminopropyltrimethoxysilane, 3-glycidoxypropyltrimethoxysilane, vinyltrimethoxysilane, vinyltriethoxysilane, γ-methacryloxypropyltrimethoxysilane, γ-methacryloxypropyltriethoxysilane, γ-aminopropyltrimethoxysilane, γ-aminopropyltriethoxysilane, N-β-(aminoethyl)-γ-aminopropyltrimethoxysilane, β-cyanoethyltriethoxysilane, glycidoxymethyltrimethoxysilane, glycidoxymethyltriethoxysilane, α-glycidoxyethyltrimethoxysilane, α-glycidoxyethyltriethoxysilane, β-glycidoxyethyltrimethoxysilane, 3-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltriisopropoxysilane, γ-glycidoxypropyltributoxysilane, γ-glycidoxypropyltrimethoxysilane, α-glycidoxybutyltrimethoxysilane, α-glycidoxybutyltriethoxysilane, β-glycidoxybutyltrimethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, 2-(3,4-epoxycyclohexyl)ethyltripropoxysilane, 2-(3,4-epoxycyclohexyl)ethyltributoxysilane, 2-(3,4-epoxycyclohexyl)ethyltrimethoxysilane, 2-(3,4-epoxycyclohexyl)ethyltriethoxysilane, 3-(3,4- epoxycyclohexyl)propyltrimethoxysilane, 3-(3,4-epoxycyclohexyl)propyltriethoxysilane, 4-(3,4-epoxycyclohexyl)butyltrimethoxysilane, 4-(3,4-epoxycyclohexyl)butyltriethoxysilane, trifluoromethyltrimethoxysilane, trifluoromethyltriethoxysilane, trifluoropropyltrimethoxysilane, trifluoropropyltriethoxysilane, perfluoropropylethyltrimethoxysilane, perfluoropropylethyltriethoxysilane, perfluoropentylethyltrimethoxysilane, perfluoropentylethyltriethoxysilane, tridecafluorooctyltrimethoxysilane, tridecafluorooctyltriethoxysilane, tridecafluorooctyltripropoxysilane, tridecafluorooctyltriisopropoxysilane, heptadecafluorodecyltrimethoxysilane and heptadecafluorodecyltriethoxysilane. Of these, methyltrimethoxysilane, methyltriethoxysilane, phenyltrimethoxysilane or phenyltriethoxysilane is preferred, in terms of availability.

Examples of bifunctional alkoxysilane compounds represented by the general formula (2) include dimethyldimethoxysilane, dimethyldiethoxysilane, diphenyldimethoxysilane, diphenyldiethoxysilane, methylphenyldimethoxysilane, methylvinyldimethoxysilane, methylvinyldiethoxysilane, γ-glycidoxypropylmethyldimethoxysilane, α-aminopropylmethyldimethoxysilane, γ-aminopropylmethyldiethoxysilane, N-(2-aminoethyl)-3-aminopropylmethyldimethoxysilane, γ-methacryloxypropylmethyldimethoxysilane, α-methacryloxypropylmethyldiethoxysilane, glycidoxymethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylmethyldiethoxysilane, γ-glycidoxypropylmethyldimethoxysilane, γ-glycidoxypropylmethyldiethoxysilane, γ-glycidoxypropylmethyldipropoxysilane, β-glycidoxy propylmethyldibutoxysilane, γ-glycidoxypropylmethylmethoxyethoxysilane, γ-glycidoxypropylethyldimethoxysilane, γ-glycidoxypropylethyldiethoxysilane, γ-glycidoxypropylvinyldimethoxysilane, γ-glycidoxypropylvinyldiethoxysilane, trifluoropropylmethyldimethoxysilane, trifluoropropylmethyldiethoxysilane, trifluoropropylethyldimethoxysilane, trifluoropropylethyldiethoxysilane, trifluoropropylvinyldimethoxysilane, trifluoropropylvinyldiethoxysilane, heptadecafluorodecylmethyldimethoxysilane, 3-chloropropylmethyldimethoxysilane, 3-chloropropylmethyldiethoxysilane, cyclohexylmethyldimethoxysilane and octadecylmethyldimethoxysilane. In terms of availability, a dimethyldialkoxysilane, a diphenyldialkoxysilane or a methylphenyldialkoxysilane is preferred.

Examples of tetrafunctional alkoxysilane compounds represented by the general formula (3) include tetramethoxysilane or tetraethoxysilane.

Examples of the solvent to be used include diacetone alcohol, propylene glycol monomethyl ether acetate (hereinafter referred to as "PGMEA"), ethyl lactate and γ-butyrolactone. Of these, PGMEA, γ-butyrolactone or diacetone alcohol is preferred in terms of transmittance, as well as the ease of controlling the hydrolysis and condensation polymerization reactions.

The amount of the solvent to be used is preferably from 50 to 500 parts by mass, and more preferably from 80 to 200 parts by mass, with respect to 100 parts by mass of the alkoxysilane compound. When the amount of solvent is 50 parts by mass or more, the generation of gel can be inhibited. When the amount of the solvent is 500 parts by mass or less, on the other hand, the hydrolysis reaction is allowed to proceed rapidly.

Examples of the acid catalyst to be used include hydrochloric acid, acetic acid, formic acid, nitric acid, oxalic acid, sulfuric acid, phosphoric acid, polyphosphoric acid, polycarboxylic acids and anhydrides thereof, and ion exchange resins. However, an aqueous solution of formic acid, acetic acid or phosphoric acid is preferred.

The amount of the acid catalyst to be used (the amount of an acidic compound, in cases where an aqueous solution of the acidic compound is used) is preferably from 0.05 to 10 parts by mass, and more preferably from 0.1 to 5 parts by mass, with respect to 100 parts by mass of the alkoxysilane compound. When the amount of the acid catalyst is 0.05 parts by mass or more, the hydrolysis reaction is allowed to proceed rapidly. When the amount of the acid catalyst is 10 parts by mass or less, on the other hand, the hydrolysis reaction can be easily controlled.

Water to be used for preparing an aqueous solution of an acidic compound is preferably ion exchanged water. The amount of water to be used is preferably from 1.0 to 4.0 moles with respect to 1 mole of the alkoxysilane compound.

In terms of preventing an abrupt hydrolysis reaction, the acid catalyst is preferably added over a period of time from 1 to 180 minutes; the reaction temperature is preferably from room temperature to 110° C., more preferably from 40 to 105° C.; and the reaction time is preferably from 1 to 180 minutes after the completion of the addition by dropping.

After obtaining a silanol compound by a hydrolysis reaction, the resulting reaction liquid is preferably heated as it is at a temperature of 50° C. or higher and equal to or lower than the boiling point of the solvent, for 1 to 100 hours, to allow a condensation polymerization reaction to proceed. Further, the reaction liquid may be re-heated, or a base catalyst may be added to the reaction liquid, in order to increase the degree of polymerization of the resulting polysiloxane.

The scintillator layer included in the scintillator panel according to an aspect of the present invention contains a phosphor. As the phosphor, cesium iodide (CsI:Tl) doped with thallium, or gadolinium oxysulfide (GOS:Tb) doped with terbium is preferred, for example, which has a high conversion efficiency from radiation to visible light.

When the scintillator layer included in the scintillator panel according to the present invention contains a binder resin, it is possible to form a more homogeneous continuous phase. Examples of the binder resin include epoxy resins, silicone resins (including organopolysiloxane cured products (crosslinked products) such as silicone rubbers and silicone gel), urea resins, fluororesins, polycarbonate resins, polyvinyl butyral resins, acrylic resins and ethyl cellulose resins. The binder resin is preferably a resin having an excellent molding workability such as thermosetting properties or photo-curing properties, transparency, heat resistance, adhesion or the like. The binder resin is more preferably an epoxy resin or a silicone resin in terms of transparency, heat resistance and the like, and still more preferably a silicone resin in terms of more excellent heat resistance.

Particularly, the binder resin is preferably an addition reaction-curable silicone composition, which is cured at normal temperature or at a temperature of from 50 to 200° C., and which has an excellent transparency, heat resistance and adhesion. Examples of the addition reaction-curable silicone composition include a composition containing a silicone containing a silicon atom to which an alkenyl group is directly bound, a silicone containing a silicon atom to which a hydrogen atom is directly bound, and a catalytic amount of a platinum-based catalyst as a hydrosilylation reaction catalyst. Examples of the addition reaction-curable silicone composition as described above include OE-6630 and OE-6636 (both manufactured by Dow Corning Toray Co., Ltd.), and SCR-1012 and SCR-1016 (both manufactured by Shin-Etsu Chemical Co., Ltd.).

The silicone resin is preferably a silicone resin containing a siloxane bond, and a silicon atom to which an aryl group and/or a naphthyl group are/is directly bound, and more preferably a silicone resin containing a silicon atom to which an aryl group and a naphthyl group are directly bound, in terms of realizing a high refractive index, heat resistance and weather resistance of the scintillator layer at the same time.

Particularly, the silicone resin is preferably a crosslinked product obtained by a hydrosilylation reaction of a composition including: an organopolysiloxane (hereinafter referred to as "component (A)") represented by the following average unit formula (4); an organopolysiloxane (hereinafter referred to as "component (B)") represented by the following general formula (5); an organotrisiloxane (hereinafter referred to as "component (C)") represented by the following general formula (6); and a hydrosilylation reaction catalyst (hereinafter referred to as "component (D)"). When the above described crosslinked product is used as the binder resin, the storage modulus at a temperature of from 60 to 250° C. is reduced, and a high adhesion strength can be obtained by heating. As a result, it is possible to form a scintillator layer in the form of a sheet which does not require an adhesive.

[Chem. 4]

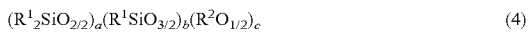

$$(R^1{}_2SiO_{2/2})_a(R^1SiO_{3/2})_b(R^2O_{1/2})_c \qquad (4)$$

(In the formula (4), $R^1$s each independently represents a phenyl group, an alkyl group or a cycloalkyl group having from 1 to 6 carbon atoms, or an alkenyl group having from 2 to 6 carbon atoms (with the proviso that from 65 to 75% by mole of $R^1$s are phenyl groups, and from 10 to 20% by mole of $R^1$s are alkenyl groups); $R^2$s each independently represents a hydrogen atom or an alkyl group having from 1 to 6 carbon atoms; and a, b and c are numbers satisfying the following relations: 0.5≤a≤0.6, 0.4≤b≤0.5, 0≤c≤0.1, and a+b=1.)

[Chem. 5]

$$R^3{}_3SiO(R^3{}_2SiO)_mSiR^3{}_3 \qquad (5)$$

(In the formula (5), $R^3$s each independently represents a phenyl group, an alkyl group or a cycloalkyl group having from 1 to 6 carbon atoms, or an alkenyl group having from 2 to 6 carbon atoms (with the proviso that from 40 to 70% by mole of $R^3$s are phenyl groups, and at least one of $R^3$s is an alkenyl group); and m represents an integer of from 5 to 50.)

[Chem. 6]

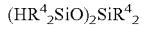 

$$(HR^4{}_2SiO)_2SiR^4{}_2 \qquad (6)$$

$$(HR^4{}_2SiO)_2SiR^4{}_2$$

(In the formula (6), $R^4$s each independently represents a phenyl group, or an alkyl group or a cycloalkyl group having from 1 to 6 carbon atoms (with the proviso that from 30 to 70% by mole of $R^4$s are phenyl groups).) When a, b and c in the average unit formula (4) satisfy the relations: 0.5≤a≤0.6, 0.4≤b≤0.5, 0≤c≤0.1, and a+b=1, the resulting crosslinked product is sufficiently cured at room temperature, and at the same time, softens at a high temperature.

In the general formula (5), from 40 to 70% by mole of $R^3$s are phenyl groups, and at least one of $R^3$s is an alkenyl group. When less than 40% by mole of $R^3$s are phenyl groups, the softening of the resulting crosslinked product at a high temperature may be insufficient. When more than 70% by mole of $R^3$s are phenyl groups, on the other hand, the transparency of the resulting crosslinked product is deteriorated, and the mechanical strength thereof is also decreased. It is necessary that at least one of $R^3$s be an alkenyl group, otherwise the component (B) may not be included in the crosslinking reaction. Further, when m in the general formula (5) is from 5 to 50, it is possible to maintain the handling workability of the resulting crosslinked product, while maintaining the mechanical strength.

The ratio of the component (B) with respect to 100 parts by mass of the component (A) is preferably from 5 to 15 parts by mass, in terms of allowing the resulting crosslinked product to sufficiently soften at a high temperature.

$R^4$s in the general formula (6) may be, for example, a methyl group, an ethyl group, a propyl group, a butyl group, a pentyl group or a heptyl group, or a cyclopentyl group or a cycloheptyl group. In the general formula (6), it is preferred that from 30 to 70% by mole of $R^4$s be phenyl groups, in terms of allowing the resulting crosslinked product to sufficiently soften at a high temperature, as well as maintaining the transparency and the mechanical strength thereof.

The molar ratio of hydrogen atoms directly bound to silicon atoms in the component (C), to the total amount of alkenyl groups in the component (A) and the component (B), is preferably from 0.5 to 2, in terms of allowing the resulting crosslinked product to be sufficiently cured at room temperature.

Examples of the component (D) include platinum-based catalysts, rhodium-based catalysts and palladium-based catalysts. However, the component (D) is preferably a platinum-based catalyst, in terms of its capability to significantly accelerate the curing of the composition. Examples of the platinum-based catalyst include platinum fine powder, chloroplatinic acid, an alcoholic solution of chloroplatinic acid, a platinum-alkenylsiloxane complex, a platinum-olefin complex and a platinum-carbonyl complex. Of these, a platinum-alkenylsiloxane complex is preferred. The alkenylsiloxane may be, for example, 1,3-divinyl-1,1,3,3-tetramethyldisiloxane or 1,3,5,7-tetramethyl-1,3,5,7-tetravinylcyclotetrasiloxane; an alkenylsiloxane obtained by substituting a part of methyl groups in the above described alkenylsiloxane with an ethyl group, a phenyl group, or the like; or an alkenylsiloxane obtained by substituting a vinyl group in the above described alkenylsiloxane with an allyl group, a hexenyl group, or the like. However, 1,3-divinyl-1,1,3,3-tetramethyldisiloxane is preferred in terms of excellent stability. Further, in terms of further improving the stability of a platinum-alkenylsiloxane complex, it is preferred to add to the platinum-alkenylsiloxane complex, for example, an alkenylsiloxane such as 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane or 1,3,5,7-tetramethyl-1,3,5,7-tetravinylcyclotetrasiloxane; or an organosiloxane oligomer such as dimethylsiloxane oligomer. It is more preferred that an alkenylsiloxane be added.

The ratio of the component (D) in the composition is preferably from 0.01 to 500 ppm, more preferably from 0.01 to 100 ppm, and still more preferably from 0.01 to 50 ppm, in terms of allowing the resulting crosslinked product to be sufficiently crosslinked, and preventing the occurrence of coloration and the like.

The composition may include, in addition to the above described components (A) to (D), a reaction inhibitor, for example, an alkyne alcohol such as ethynylhexanol, 2-methyl-3-butyn-2-ol, 3,5-dimethyl-1-hexyn-3-ol, or 2-phenyl-3-butyn-2-ol; an enyne compound such as 3-methyl-3-penten-1-yne or 3,5-dimethyl-3-hexen-1-yne; 1,3,5,7-tetramethyl-1,3,5,7-tetravinylcyclotetrasiloxane, 1,3,5,7-tetramethyl-1,3,5,7-tetrahexenylcyclotetrasiloxane or benzotriazole. The ratio of the reaction inhibitor in the composition is preferably from 1 to 5,000 ppm. It is also possible to adjust the storage modulus of the resulting crosslinked product by adjusting the ratio of the reaction inhibitors as appropriate.

The scintillator panel according to the present invention preferably includes a barrier rib for partitioning the scintillator layer.

Further, the radiation detector according to the present invention is characterized by including the scintillator panel according to the present invention.

In addition, the method of manufacturing a radiation detector according to an aspect of the present invention is a method of manufacturing a radiation detector which includes: the scintillator panel according to the invention; and a photodiode substrate including a photodiode facing the partitioned scintillator layer of the scintillator panel. The manufacturing method is characterized by including: (A) an alignment step of aligning the positions of the scintillator layer and the photodiode; and (B) a pasting step of pasting the scintillator panel and the photodiode substrate.

When the scintillator panel according to the present invention includes a barrier rib, the scintillator layer is filled within cells partitioned by the barrier rib. Accordingly, when the size and pitch of the cells of the scintillator panel are adjusted to coincide with the size and pitch of the photodiodes arranged on the photodiode substrate facing the scintillator panel, it is possible to prevent scattered light from reaching adjacent cells, even when light is scattered by the phosphor. This serves to reduce the blurring of images due to scattering of light, and thereby allows for a high precision photographing.

In terms of durability and heat resistance, the barrier rib is preferably made of a material comprising glass as a main component, and more preferably made of a material comprising as a main component a low melting point glass which contains from 2 to 20% by mass of an alkali metal oxide. The material comprising as a main component a low melting point glass which contains from 2 to 20% by mass of an alkali metal oxide has an appropriate refractive index and softening temperature, and is suitable for forming a barrier rib having a narrow width over a large area and with high accuracy. The low melting point glass as used herein refers to a glass having a softening temperature of 700° C. or lower. Further, the expression that the barrier rib is made of a material comprising a low melting point glass as a main component means that from 50 to 100% by mass of the material constituting the barrier rib is a low melting point glass powder.

The softening temperature of the low melting point glass can be obtained by measuring a sample with a differential thermal analyzer (such as differential-type differential thermal balance TG8120; manufactured by Rigaku Corporation) to obtain a DTA curve, and by extrapolating a heat absorption completion temperature at an endothermic peak by a tangent method, from the DTA curve. More specifically, a low melting point glass powder as a measurement sample is measured by elevating the temperature at a rate of 20° C./min from room temperature using a differential thermal analyzer, with an alumina powder as a standard sample, to obtain a DTA curve. From the thus obtained DTA curve, a softening point Ts is determined by extrapolating a heat absorption completion temperature at an endothermic peak by a tangent method, and the softening point Ts can be used as the softening temperature of the low melting point glass.

The barrier rib made of a material comprising as a main component a low melting point glass which contains from 2 to 20% by mass of an alkali metal oxide can be manufactured by a manufacturing method which includes, for example, the following steps:
(1) a coating step of coating on a substrate a photosensitive paste containing a low melting point glass powder which contains from 2 to 20% by mass of an alkali metal oxide, and a photosensitive organic component, to form a photosensitive paste coating film;
(2) an exposure step of exposing the resulting photosensitive paste coating film through a photomask having a predetermined opening;
(3) a development step of dissolving and removing the portion of the photosensitive paste coating film after the exposure which is soluble in a developer; and
(4) a calcination step of heating a photosensitive paste coating film pattern obtained after the development at a high temperature, to remove the organic component, as well as to carry out softening and sintering of the low melting point glass, thereby forming a barrier rib.

Calcination in the calcination step is preferably carried out at a calcination temperature of from 500 to 700° C., and more preferably from 500 to 650° C. By carrying out the calcination at a temperature within the above range, the organic component is decomposed and removed by evaporation, and, at the same time, the low melting point glass powder is softened and sintered, to form a barrier rib containing the low melting point glass. When the calcination is carried out at a calcination temperature of 500° C. or higher, in order to completely remove the organic component, it is possible to allow the decomposition and removal by evaporation of the organic component as well as the softening and sintering of the low melting point glass to proceed sufficiently. When the calcination temperature exceeds 700° C., on the other hand, and in cases where a glass substrate is used, deformation of the substrate may be increased.

It is preferred that a reflective layer having a reflectance of 80% or more be formed on the surfaces of the substrate and of the barrier rib. By forming a reflective layer, the light emitted by the phosphor can be efficiently guided to the photodiode of the photodiode substrate, thereby improving the luminance. In cases where a reflective layer having a reflectance of 80% or more is formed on the surface of the barrier rib, it is possible to inhibit a so-called cross-talk, a phenomenon in which the light emitted by the phosphor reaches the adjacent cells. The reflective layer preferably has a reflectance of 85% or more, and more preferably 90% or more. The reflectance as used herein refers to a reflectance of light having a wavelength of 550 nm.

The reflectance of the reflective layer formed on the substrate and the like can be measured using a spectrocolorimeter in SCI mode.

It is preferred that a low refractive index layer be further formed on the surface of the reflective layer. By forming a low refractive index layer, it is possible to allow total reflection at the interface between the scintillator layer and the low refractive index layer. In other words, the formation of a low refractive index layer allows the light emitted by the phosphor to be efficiently guided to the photodiode of the photodiode substrate, based on a principle similar to that of an optical fiber, thereby improving the luminance. In cases where a low refractive index layer is further formed on the surface of the reflective layer formed on the surface of the barrier rib, it is possible to inhibit a so-called cross-talk, a phenomenon in which the light emitted by the phosphor reaches the adjacent cells.

The low refractive index layer preferably has a refractive index of 1.5 or less, and more preferably 1.45 or less.

The refractive index of the low refractive index layer can be measured using a refractometer. More specifically, light having a wave length of 633 nm (using He—Ne laser) is irradiated vertically to the surface of the low refractive index layer at 25° C., and the refractive index (TE) of the light is measured, to be used as the refractive index of the low refractive index layer.

The low refractive index layer preferably contains a compound selected from the group consisting of silica, water glass, a silicone resin, magnesium fluoride and a fluororesin, in terms of forming a low refractive index layer having a low refractive index and a high density.

EXAMPLES

The present invention will now be more specifically described with reference to Examples and Comparative Examples. However, the present invention is by no means limited by the Examples.
(Metal Compound Particles)

As the metal compound particles, the following compounds were used. Silicon oxide-titanium oxide composite particles, "OPTOLAKE (registered trademark) TR-527" (manufactured by Catalyst & Chemicals Industries Co., Ltd; average particle diameter: 15 nm, refractive index: 2.50, titanium oxide particles: 20% by mass)
Tin oxide particles, "SNI" (average particle diameter: 19 nm, refractive index: 2.38) Aluminum oxide particles "SA1" (average particle diameter: 34 nm, refractive index: 1.76)
Cerium oxide particles "CS1" (average particle diameter: 34 nm, refractive index: 2.20)
Zirconium oxide "ZS1" (average particle diameter: 15 nm, refractive index: 2.40, zirconium oxide particles: 20% by mass, PGMEA: 80% by mass)
Magnesium oxide particles "MS 1" (average particle diameter: 44 nm, refractive index: 1.76)
Zinc oxide particles "AS1" (average particle diameter: 94 nm, refractive index: 1.95) Niobium oxide particles "NS 1" (average particle diameter: 15 nm, refractive index: 2.30, niobium oxide particles: 20% by mass, PGMEA: 80% by mass)
Titanium oxide particles "TS1" (average particle diameter: 30 nm, refractive index: 2.50, titanium oxide particles: 20% by mass, PGMEA: 80% by mass)
Titanium oxide particles "TS2" (average particle diameter: 50 nm, refractive index: 2.50, titanium oxide particles: 20% by mass, PGMEA: 80% by mass)
Titanium oxide particles "TS3" (average particle diameter: 70 nm, refractive index: 2.50, titanium oxide particles: 20% by mass, PGMEA: 80% by mass)
(Grafting of Metal Compound Particles)

The metal compound particles were grafted as follows. First, 72.8 g of an alkoxysilane compound (a mixture of methyltrimethoxysilane, phenyltrimethoxysilane and/or dimethyldimethoxysilane), 38.8 g (solid content) of the metal compound particles, and 126.9 g of PGMEA were introduced into a reaction vessel, followed by stirring. To the resultant, 21.9 g of water and 0.36 g of phosphoric acid were added by dropping, with care that the reaction temperature did not exceed 40° C. After the completion of the dropping, a distillation apparatus was attached to the reaction vessel. The resulting solution was then heated for 2.5 hours at a bath temperature of 105° C., and the reaction was allowed to proceed while removing methanol generated by hydrolysis by distillation. Subsequently, the resultant was further heated for 2 hours at a bath temperature of 115° C., followed by cooling to room temperature, to obtain metal compound particles grafted with polysiloxane.
(Preparation of Scintillator Layer Paste)

Examples of the raw material of a scintillator layer paste for forming a scintillator layer, and the preparation method thereof are as follows.
Phosphor: GOS: Tb (manufactured by Nichia Corporation; median size ($D_{50}$): 10 μm, refractive index: 2.2)
Binder resin 1: "OE-6630 (liquid A, liquid B)" (manufactured by Dow Corning Toray Co., Ltd.; volume ratio of liquid A/liquid B=1/4)
Binder resin 2: ethyl cellulose (manufactured by Hercules Inc.)

A quantity of 0.3 g (solid content) of the grafted metal compound particles or ungrafted metal compound particles, 9.7 g of the phosphor, and 20 g of PGMEA, and further, 0.3 g of the binder resin 1 or the binder resin 2 as required, were mixed. The resultant was stirred and deaerated for 20 minutes at 1,000 rpm, using a planetary mixer/deaerator (MAZERUSTAR KK-400; manufactured by Kurabo Industries Ltd.), to obtain a scintillator layer paste.

Example 1

"OPTOLAKE (registered trademark) TR-527" was grafted with an alkoxysilane compound including respective components at the ratio shown in Table 1, and a scintillator layer paste 1 was obtained using the resulting grafted particles (no binder resin was added). The thus obtained scintillator layer paste 1 was coated with a bar coater on a highly reflective polyethylene terephthalate film (E6SQ; manufactured by Toray Industries, Inc.; film thickness: 250 μm, reflectance: 96%) as a substrate, to a coating film thickness of 400 m. The resultant was then dried and cured at 100° C. for 30 minutes, to form a scintillator panel.

The thus formed scintillator panel was set in a FPD (PaxScan 2520 (manufactured by Varian Medical Systems)), to produce a radiation detector. Radiation at a tube voltage of 80 kVp was applied from the substrate side of the scintillator panel, and the luminance of the scintillator panel was detected by the FPD. The coverage ratio of the phosphor by the metal compound was 74%. The porosity of the scintillator layer was 30%.

Comparative Example 1

A quantity of 9.7 g of the phosphor, 0.3 g of the binder resin 2, and 20 g of terpineol were mixed. The resultant was stirred and deaerated for 20 minutes at 1,000 rpm, using a planetary mixer/deaerator (MAZERUSTAR KK-400; manufactured by Kurabo Industries Ltd.), to obtain a scintillator layer paste 21 which does not contain metal compound particles. The thus obtained scintillator layer paste 21 was coated with a bar coater on a highly reflective polyethylene terephthalate film (E6SQ; manufactured by Toray Industries, Inc.; film thickness: 250 μm, reflectance: 96%) as a substrate, to a coating film thickness of 400 μm. The resultant was then dried and cured at 100° C. for 30 minutes, to form a scintillator panel.

The thus formed scintillator panel was set in a FPD (PaxScan 2520), to produce a radiation detector. Radiation at a tube voltage of 80 kVp was applied from the substrate side of the scintillator panel, and the luminance of the scintillator panel was detected by the FPD. Since the scintillator layer contains no metal compound, the coverage ratio of the phosphor by the metal compound was 0%. The porosity of the scintillator layer was 30%. The evaluation of the luminance of the scintillator panel of each of Example 1 and other Examples was performed as a relative evaluation, with the luminance of the scintillator panel of Comparative Example 1 taken as 100. The result of the relative evaluation of the scintillator panel of Example 1 is shown in Table 1.

Examples 2 to 5

Scintillator panels were prepared and evaluated in the same manner as in Example 1, except that the metal compound particles shown in Table 1 were used in each of the Examples. The results are shown in Table 1.

The comparison of the results of Examples 1 to 5 with the result of Comparative Example 1 clearly shows that the incorporation of the grafted metal compound particles into the scintillator layer serves to improve the luminance of the scintillator panel.

TABLE 1

|  | Scintillator paste | Grafted metal compound particles (solid content) | | | Preparation ratio | |
|---|---|---|---|---|---|---|
|  |  | Ratio of alkoxysilane compound (mol %) | | Metal compound particles | Grafted metal compound particles (solid content) (g) | Phosphor (g) |
|  |  | Methyltrimethoxysilane | Phenyltrimethoxysilane |  |  |  |
| Example 1 | 1 | 70 | 30 | "OPTOLAKE TR-527" | 0.3 | 9.7 |
| Example 2 | 2 |  |  | "SN1" | 0.3 | 9.7 |
| Example 3 | 3 |  |  | "SA1" | 0.3 | 9.7 |
| Example 4 | 4 |  |  | "ZS1" | 0.3 | 9.7 |
| Example 5 | 5 |  |  | "NS1" | 0.3 | 9.7 |
| Comparative Example 1 | 21 | — (Not grafted) | | — | — | 9.7 |

|  | Preparation ratio | | | Coverage ratio (%) | Porosity (%) | Relative brightness (%) |
|---|---|---|---|---|---|---|
|  | PGMEA (g) | Terpineol (g) | Binder resin 2 (g) |  |  |  |
| Example 1 | 20.0 | — | 0.3 | 74 | 30 | 125 |
| Example 2 | 20.0 | — | 0.3 | 70 | 30 | 110 |
| Example 3 | 20.0 | — | 0.3 | 65 | 30 | 105 |
| Example 4 | 20.0 | — | 0.3 | 72 | 30 | 120 |
| Example 5 | 20.0 | — | 0.3 | 68 | 30 | 115 |
| Comparative Example 1 | — | 20.0 | 0.3 | 0 | 30 | 100 |

Examples 6 to 8

Scintillator panels were prepared and evaluated in the same manner as in Example 1, except that the metal compound particles shown in Table 2 were used in each of the Examples. The results are shown in Table 2.

The comparison of the results of Examples 6 to 8 with the result of Comparative Example 1 clearly shows that the incorporation of the grafted metal compound particles into the scintillator layer serves to improve the luminance of the scintillator panel.

TABLE 2

|  | Scintillator paste | Grafted metal compound particles (solid content) | | | |
|---|---|---|---|---|---|
|  |  | Ratio of alkoxysilane compound (mol %) | | Metal compound particles | Particle diameter (nm) |
|  |  | Methyltrimethoxysilane | Phenyltrimethoxysilane |  |  |
| Example 1 | 1 | 70 | 30 | "OPTOLAKE TR-527" | 15 |
| Example 6 | 6 |  |  | "TS1" | 30 |
| Example 7 | 7 |  |  | "TS2" | 50 |
| Example 8 | 8 |  |  | "TS3" | 70 |

TABLE 2-continued

| | Preparation ratio | | | | | | |
|---|---|---|---|---|---|---|---|
| | Grafted metal compound particles (solid content) (g) | Phosphor (g) | PGMEA (g) | Binder resin 2 (g) | Coverage ratio (%) | Porosity (%) | Relative brightness (%) |
| Example 1 | 0.3 | 9.7 | 20.0 | 0.3 | 74 | 30 | 125 |
| Example 6 | 0.3 | 9.7 | 20.0 | 0.3 | 68 | 30 | 120 |
| Example 7 | 0.3 | 9.7 | 20.0 | 0.3 | 60 | 30 | 115 |
| Example 8 | 0.3 | 9.7 | 20.0 | 0.3 | 50 | 30 | 105 |

Examples 9 and 10

Scintillator panels were prepared and evaluated in the same manner as in Example 1 to 5, except that the metal compound particles shown in Table 3 were used in each of the Examples. The results are shown in Table 3.

The comparison of the results of Examples 9 and 10 with the result of Comparative Example 1 clearly shows that the incorporation of the grafted metal compound particles into the scintillator layer serves to improve the luminance of the scintillator panel.

TABLE 3

| | Scintillator paste | Grafted metal compound particles (solid content) | | | Metal compound particles |
|---|---|---|---|---|---|
| | | Ratio of alkoxysilane compound (mol %) | | | |
| | | Methyltrimethoxysilane | Phenyltrimethoxysilane | Dimethyldimethoxysilane | |
| Example 1 | 1 | 70 | 30 | 0 | "OPTOLAKE TR-527" |
| Example 9 | 9 | 40 | 30 | 30 | |
| Example 10 | 10 | 30 | 30 | 40 | |

| | Preparation ratio | | | | | | |
|---|---|---|---|---|---|---|---|
| | Grafted metal compound particles (solid content) (g) | Phosphor (g) | PGMEA (g) | Binder resin 2 (g) | Coverage ratio (%) | Porosity (%) | Relative brightness (%) |
| Example 1 | 0.3 | 9.7 | 20.0 | 0.3 | 74 | 30 | 125 |
| Example 9 | 0.3 | 9.7 | 20.0 | 0.3 | 73 | 30 | 125 |
| Example 10 | 0.3 | 9.7 | 20.0 | 0.3 | 74 | 30 | 125 |

Examples 11 to 15

Scintillator panels were prepared and evaluated in the same manner as in Example 1, except that the binder resin 1 was used instead of the binder resin 2 in each of the Examples. The results are shown in Table 4.

The comparison of the results of Examples 11 to 15 with the result of Comparative Example 1 clearly shows that the incorporation of the grafted metal compound particles into the scintillator layer serves to improve the luminance of the scintillator panel.

TABLE 4

| | Scintillator paste | Grafted metal compound particles (solid content) | | Metal compound particles | Preparation ratio | |
|---|---|---|---|---|---|---|
| | | Ratio of alkoxysilane compound (mol %) | | | Grafted metal compound particles (solid content) (g) | Phosphor (g) |
| | | Methyltrimethoxysilane | Phenyltrimethoxysilane | | | |
| Example 11 | 11 | 70 | 30 | "OPTOLAKE TR-527" | 0.3 | 9.7 |
| Example 12 | 12 | | | "SN1" | 0.3 | 9.7 |
| Example 13 | 13 | | | "SA1" | 0.3 | 9.7 |

TABLE 4-continued

| | | | | | |
|---|---|---|---|---|---|
| Example 14 | 14 | | "ZS1" | 0.3 | 9.7 |
| Example 15 | 15 | | "NS1" | 0.3 | 9.7 |

| | Preparation ratio | | | | |
|---|---|---|---|---|---|
| | PGMEA (g) | Binder resin 1 (g) | Coverage ratio (%) | Porosity (%) | Relative brightness (%) |
| Example 11 | 20.0 | 0.3 | 65 | 30 | 125 |
| Example 12 | 20.0 | 0.3 | 59 | 30 | 110 |
| Example 13 | 20.0 | 0.3 | 57 | 30 | 105 |
| Example 14 | 20.0 | 0.3 | 60 | 30 | 120 |
| Example 15 | 20.0 | 0.3 | 59 | 30 | 115 |

Examples 16 to 20

Scintillator panels were prepared and evaluated in the same manner as in Example 11, except that the preparation ratio of the scintillator layer paste was varied in each of the Examples. The results are shown in Table 5.

The comparison of the results of Examples 16 to 20 with the result of Comparative Example 1 clearly shows that the incorporation of the grafted metal compound particles into the scintillator layer serves to improve the luminance of the scintillator panel.

UV absorber solution: a 0.3% by mass α-butyrolactone solution of Sudan IV (manufactured by Tokyo Ohka Kogyo Co., Ltd.)

Thermal polymerization initiator: 1,1'-azobis(cyclohexane-1-carbonitrile) Binder polymer: ethyl cellulose (manufactured by Hercules Inc.)

Viscosity modifier: Flownon EC 121 (manufactured by Kyoeisha Chemical Co. Ltd.) Solvent: γ-butyrolactone Silica dispersion: IPA-ST-UP (solid content: 15.6% by mass, isopropyl alcohol solvent)

TABLE 5

| | | Grafted metal compound particles (solid content) | | | Preparation ratio |
|---|---|---|---|---|---|
| | Scintillator paste | Ratio of alkoxysilane compound (mol %) | | Metal compound particles | Grafted metal compound particles (solid content) (g) |
| | | Methyltrimethoxysilane | Phenyltrimethoxysilane | | |
| Example 11 | 11 | 70 | 30 | "OPTOLAKE TR-527" | 0.3 |
| Example 16 | 16 | | | | 0.15 |
| Example 17 | 17 | | | | 0.1 |
| Example 18 | 18 | | | | 0.1 |
| Example 19 | 19 | | | | 0.5 |
| Example 20 | 20 | | | | 0.15 |

| | Preparation ratio | | | | | |
|---|---|---|---|---|---|---|
| | Phosphor (g) | PGMEA (g) | Binder resin 1 (g) | Coverage ratio (%) | Porosity (%) | Relative brightness (%) |
| Example 11 | 9.7 | 20.0 | 0.3 | 65 | 30 | 125 |
| Example 16 | 9.7 | 20.0 | 0.3 | 40 | 30 | 115 |
| Example 17 | 9.7 | 20.0 | 0.3 | 25 | 30 | 110 |
| Example 18 | 9.7 | 40.0 | 0.3 | 15 | 40 | 105 |
| Example 19 | 9.7 | 20.0 | 0.3 | 75 | 30 | 125 |
| Example 20 | 9.7 | 2.0 | 0.3 | 35 | 5 | 110 |

(Preparation of Barrier Rib Paste)

Raw materials of a barrier rib paste for forming a barrier rib are as follows.

Photosensitive monomer M-1: trimethylolpropane triacrylate

Photosensitive monomer M-2: tetrapropylene glycol dimethacrylate

Photosensitive polymer: a product obtained by an addition reaction of 0.4 equivalents of glycidyl methacrylate to carboxyl groups of a copolymer composed of methacrylic acid/methyl methacrylate/styrene in a mass ratio of 40/40/30 (weight average molecular weight: 43,000, acid value: 100)

Photopolymerization initiator: 2-benzyl-2-dimethylamino-1-(4-morpholinophenyl)butanone-1 (IC369; manufactured by BASF JAPAN LTD.)

Polymerization inhibitor: 1,6-hexanediol-bis [(3,5-di-t-butyl-4-hydroxyphenyl)propionate])

Low melting point glass powder A:

27% by mass of $SiO_2$, 31% by mass of $B_2O_3$, 6% by mass of ZnO, 7% by mass of $Li_2O$, 2% by mass of MgO, 2% by mass of CaO, 2% by mass of BaO, 23% by mass of $Al_2O_3$; refractive index (ng): 1.56, softening temperature: 588° C., thermal expansion coefficient: $68 \times 10^{-7}$, average particle diameter: 2.3 μm High melting point glass powder A:

30% by mass of $SiO_2$, 31% by mass of $B_2O_3$, 6% by mass of ZnO, 2% by mass of MgO, 2% by mass of CaO, 2% by mass of BaO, 27% by mass of $Al_2O_3$; refractive index (ng): 1.55, softening temperature: 790° C., thermal expansion coefficient: $32 \times 10^{-7}$, average particle diameter: 2.3 μm A quantity of 4 parts by mass of the photosensitive monomer M-1, 6 parts by mass of the photosensitive monomer M-2, 24 parts by mass of the photosensitive polymer, 6 parts by mass of the photopolymerization initiator, 0.2 parts by mass of the polymerization inhibitor, and 12.8 parts by mass of the UV absorber solution were dissolved in 38 parts by mass of the solvent under heating at a temperature of 80° C. After cooling the resulting solution, 9 parts by mass of the viscosity modifier was added to the resultant, to prepare an organic solution 1. The refractive index (ng) of a coating film formed from the organic solution 1 was 1.555.

To 60 parts by mass of the organic solution 1, 30 parts by mass of the low melting point glass powder A and 10 parts by mass of the high melting point glass powder A were added, and the resultant was kneaded with a three-roll kneader, to obtain a barrier rib paste.

(Preparation of Reflective Layer Coating Agent)

A quantity of 20 parts by mass of titania particles "CR-EL" (manufactured by Ishihara Sangyo Kaisha, Ltd.; average particle diameter: 0.25 μm) was mixed with 80 parts by mass terpineol, and the resultant was stirred and deaerated for 20 minutes at 1,000 rpm using a planetary mixer/deaerator, to obtain a reflective layer coating agent A for forming a reflective layer.

Further, a quantity of 40 parts by mass of titania particles "CR-EL" was mixed with 3 parts by mass of ethyl cellulose, 6 parts by mass of tetrapropylene glycol dimethacrylate, 1 part by mass of the thermal polymerization initiator, and 50 parts by mass of terpineol, and a reflective layer coating agent B for forming a reflective layer was obtained in the same manner as described above.

Example 21

On a glass substrate having a size of 500 mm×500 mm (OA-10; manufactured by Nippon Electric Glass Co. Ltd.; thermal expansion coefficient: 38×10$^{-7}$, thickness: 0.7 mm), the barrier rib paste was coated by a die coater to a dry thickness of 500 m, followed by drying to form a barrier rib paste coating film. Next, the barrier rib paste coating film was exposed to an ultra-high pressure mercury lamp (600 mJ/cm$^2$) through a photomask provided with an opening corresponding to a desired barrier rib pattern (chrome mask having a grid-like opening with both longitudinal and traverse pitches of 127 μm and a line width of 20 μm). The exposed barrier rib paste coating film was developed in a 0.5% by mass ethanolamine aqueous solution to remove unexposed portions of the film, thereby forming a grid-like pattern. Further, the resulting pattern was calcined in air at 585° C. for 15 minutes, to obtain a member including a grid-like barrier rib having a barrier rib pitch of 127 μm, a barrier rib top width of 25 μm, a barrier rib bottom width of 50 μm, a barrier rib height of 340 μm, and a size of 480 mm×480 mm.

Subsequently, the scintillator layer paste of Example 1 was filled in spaces partitioned by the barrier rib, namely cells, to form a scintillator panel. The thus formed scintillator panel was set in a FPD (PaxScan 2520; manufactured by Varian Medical Systems), to produce a radiation detector. Radiation at a tube voltage of 80 kVp was applied from the substrate side of the scintillator panel, and the luminance of the scintillator panel was detected by the FPD. Further, the MTF was measured. The coverage ratio of the phosphor by the metal compound was 74%.

Comparative Example 2

A scintillator panel was prepared in the same manner as in Example 21, except that the scintillator layer paste used in Comparative Example 1 was used instead of the scintillator layer paste used in Example 1, and the thus prepared scintillator panel was set in a FPD (PaxScan 2520) to produce a radiation detector. Radiation at a tube voltage of 80 kVp was applied from the substrate side of the scintillator panel, and the luminance of the scintillator panel was detected by the FPD. Further, the MTF was measured. The coverage ratio of the phosphor by the metal compound was 0%.

The evaluation of the luminance and the MTF in each of Examples 21 to 26 was performed as a relative evaluation, with the luminance and the MTF in Comparative Example 2 taken as 100, respectively. The results of the relative evaluation in Example 21 are shown in Table 6.

Example 22

A scintillator panel was prepared and evaluated in the same manner as in Example 21, except that the reflective layer coating agent A was coated on the surfaces of the barrier rib and the substrate using a bar coater, to form a reflective layer (reflectance: 89%) having a thickness of 10 m. The coverage ratio of the phosphor by the metal compound was 74%. The results are shown in Table 6. It can be clearly seen from the results that the formation of the reflective layer serves to improve the luminance and the MTF.

Example 23

A scintillator panel was prepared and evaluated in the same manner as in Example 22, except that water glass (a 38% by mass sodium silicate solution; manufactured by Wako Pure Chemical Industries, Ltd.; refractive index: 1.46) was coated on the surface of the reflective layer using a bar coater, to form a low refractive index layer (refractive index: 1.46) having a thickness of 3 m. The coverage ratio of the phosphor by the metal compound was 74%. The results are shown in Table 6. It can be clearly seen from the results that the formation of the low refractive index layer serves to further improve the luminance and the MTF.

Example 24

A scintillator panel was prepared and evaluated in the same manner as in Example 21, except that the reflective layer coating agent B was coated on the surfaces of the barrier rib and the substrate using a bar coater, to form a reflective layer (reflectance: 90%) having a thickness of 10 Gm. The coverage ratio of the phosphor by the metal compound was 74%. The results are shown in Table 6. It can be clearly seen from the results that the formation of the reflective layer serves to improve the luminance and the MTF.

Example 25

A scintillator panel was prepared and evaluated in the same manner as in Example 24, except that a nano-silica dispersion paste (a mixture of 10% by mass of IPA-ST-UP, 2% by mass of OE-6630, 0.1% by mass of phosphoric acid, 0.9% by mass of ultrapure water, and 87% by mass of PGMEA) was coated on the surface of the reflective layer using a bar coater, to form a low refractive index layer (refractive index: 1.38) having a thickness of 2 μm. The coverage ratio of the phosphor by the metal compound was 74%. The results are shown in Table 6. It can be clearly seen from the results that the formation of the low refractive index layer serves to further improve the luminance and the MTF.

Example 26

A scintillator panel was prepared and evaluated in the same manner as in Example 25, except for using a scintillator layer phosphor paste 22 for forming a scintillator layer, obtained by mixing 0.3 g (solid content) of the metal compound particles grafted with the alkoxysilane compound at the same ratio as the particles used in Example 1, 9.7 g of cesium iodide (CsI: Tl; median size ($D_{50}$): 20 μm, refractive index: 1.8) doped with thallium, and 20.0 g of PGMEA. The coverage ratio of the phosphor by the metal compound was 55%. The results are shown in Table 6. It can be seen from the results that the luminance and the MTF are improved.

TABLE 61

| | Barrier rib | Reflective layer | Low refractive index layer | Relative brightness (%) | Relative MTF (%) |
|---|---|---|---|---|---|
| Example 21 | Provided | Not provided | Not provided | 115 | 110 |
| Example 22 | Provided | Provided | Not provided | 120 | 150 |
| Example 23 | Provided | Provided | Provided | 130 | 160 |
| Example 24 | Provided | Provided | Not provided | 125 | 150 |
| Example 25 | Provided | Provided | Provided | 135 | 160 |
| Example 26 | Provided | Provided | Provided | 130 | 140 |
| Comparative Example 2 | Provided | Not provided | Not provided | 100 | 100 |

DESCRIPTION OF SYMBOLS

1 Radiation detector
2 Scintillator panel
3 Photodiode substrate
4 Substrate
5 Buffer layer
6 Scintillator layer
7 Diaphragm layer
8 Photoelectric conversion layer
9 Output layer
10 Substrate
11 Power supply portion

The invention claimed is:

1. A scintillator panel comprising:
a substrate; and
a scintillator layer containing a metal compound particles and a phosphor;
wherein the phosphor is covered by the metal compound at a coverage ratio of 5% or more, and
wherein the metal compound particles are grafted.

2. The scintillator panel according to claim 1, wherein the scintillator layer has a porosity of from 1 to 50%.

3. The scintillator panel according to claim 1, comprising gadolinium oxysulfide or cesium iodide as the phosphor.

4. The scintillator panel according to claim 1, further comprising a barrier rib partitioning the scintillator layer.

5. The scintillator panel according to claim 4, wherein the barrier rib is made of a material comprising as a main component a low melting point glass which contains from 2 to 20% by mass of an alkali metal oxide.

6. The scintillator panel according to claim 4, wherein a reflective layer having a reflectance of 80% or more is formed on the surface of the barrier rib.

7. The scintillator panel according to claim 4, wherein a low refractive index layer is further formed on the surface of a reflective layer.

8. The scintillator panel according to claim 7, wherein the low refractive index layer has a refractive index of 1.5 or less.

9. The scintillator panel according to claim 7, wherein the low refractive index layer contains a compound selected from the group consisting of silica, water glass, a silicone resin, magnesium fluoride and a fluororesin.

10. A method of manufacturing a radiation detector, wherein the radiation detector comprises:
the scintillator panel according to claim 4; and
a photodiode substrate including a photodiode facing the partitioned scintillator layer of the scintillator panel;
the method comprising:
(A) an alignment step of aligning the positions of the scintillator layer and the photodiode; and
(B) a pasting step of pasting the scintillator panel and the photodiode substrate.

11. The scintillator panel according to claim 1, wherein the metal compound particles have a refractive index of 1.7 or more.

12. The scintillator panel according to claim 1, comprising metal compound particles selected from the group consisting of aluminum compound particles, tin compound particles, titanium compound particles, zirconium compound particles, and niobium compound particles as the metal compound particles.

13. The scintillator panel according to claim 1, wherein the metal compound particles have an average particle diameter of from 1 to 50 nm.

14. The scintillator panel according to claim 1, wherein the metal compound particles are obtained by mixing metal compound particles, an alkoxysilane compound, a solvent, and an acid catalyst.

15. The scintillator panel according to claim 14, wherein the alkoxysilane compound contains from 70 to 100% by mole of a trifunctional alkoxysilane, and from 0 to 30% by mole of a bifunctional alkoxysilane compound.

16. The scintillator panel according to claim 1, wherein the scintillator layer further comprises a binder resin.

17. The scintillator panel according to claim 16, comprising a silicone resin as the binder resin.

18. The scintillator panel according to claim 17, comprising a silicone resin containing a siloxane bond and a silicon atom to which an aryl group and/or a naphthyl group are/is directly bound, as the silicone resin.

19. The scintillator panel according to claim 1, wherein a reflective layer having a reflectance of 80% or more is formed on the surface of the substrate.

20. The scintillator panel according to claim 1, wherein the substrate is a glass substrate, a ceramic substrate, or a film.

21. A radiation detector comprising the scintillator panel according to claim 1.

* * * * *